Feb. 26, 1935.  R. G. DE LA MATER  1,992,910
BRAKE SYSTEM FOR DRILLING EQUIPMENT
Filed Aug. 18, 1930
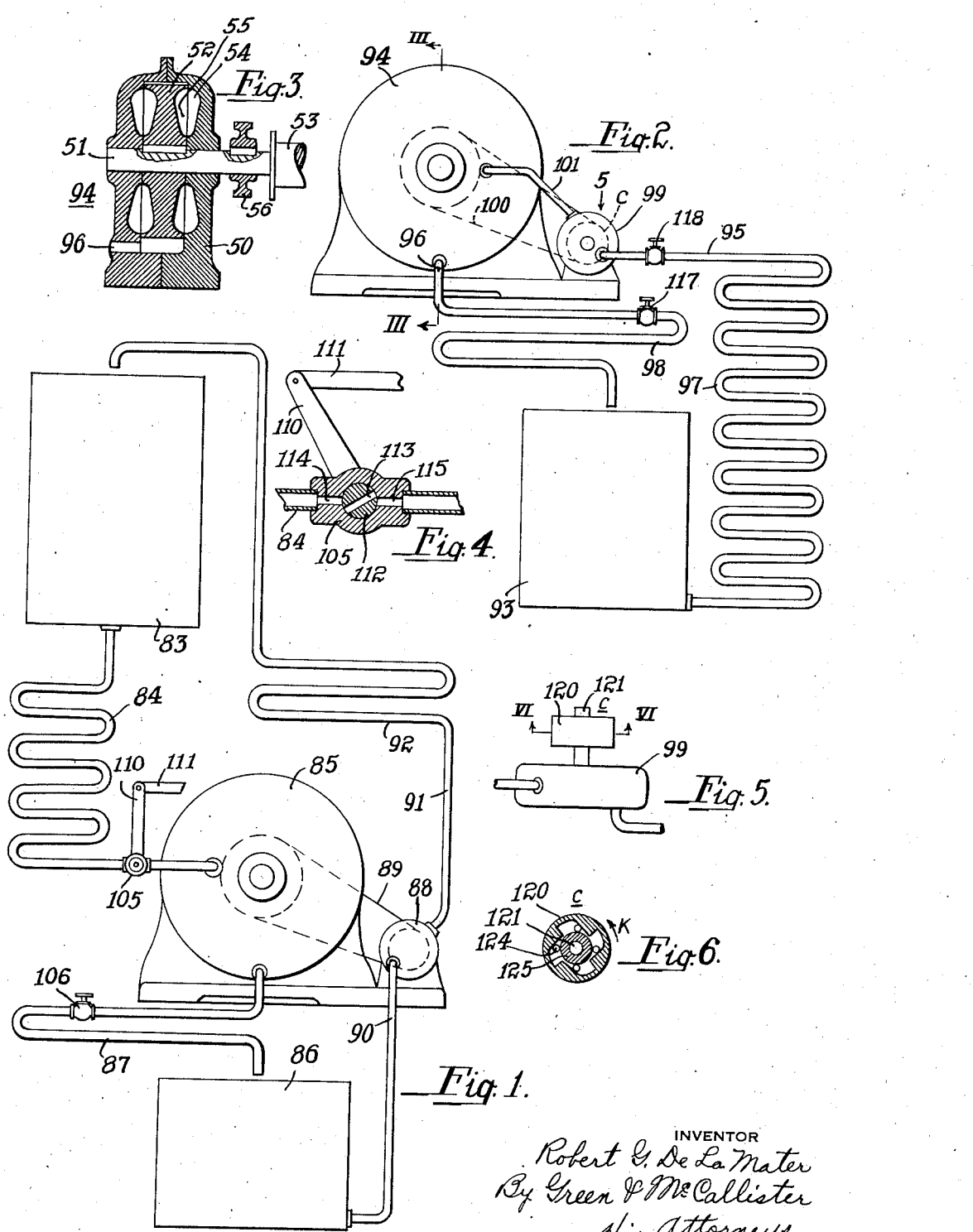

Patented Feb. 26, 1935

1,992,910

UNITED STATES PATENT OFFICE 1,992,910

BRAKE SYSTEM FOR DRILLING EQUIPMENT

Robert Griffin De La Mater, Parkersburg, W. Va., assignor to The Parkersburg Rig & Reel Company, a corporation of West Virginia Application August 18, 1930, Serial No. 476,182

15 Claims. (Cl. 188—90)

This invention relates to brake systems for hoists such as are used in well drilling operations, and more particularly to a control system for the fluid of a fluid friction brake connected to the hoist.

In drilling rigs for deep wells the load descends several thousand feet and develops a large amount of energy which I have found can be dissipated by a fluid friction brake, such, for example, as set forth in copending application Ser. No. 674,703, filed June 7, 1933 which is a division of this application. In such a brake system the fluid quickly becomes heated as it is churned about in the brake, and it is an important object of my present invention to provide means to cool the fluid and return it to the brake.

It is a further object of my invention to provide a pump or the like which is effective to vary the head of fluid in the brake to control the braking action of the brake. This result may be obtained by coupling the pump to the brake, so that the faster the load descends the higher will be the level of fluid in the brake and therefore the greater the braking action.

It is a further object of my invention to provide a brake and pump so related that the latter is operative to pump fluid into the brake when the load is descending, but inoperative to pump when the load is being raised.

It is a still further object of the invention to provide a fluid circulating system including the brake with a control means, such as valves, to vary the flow of fluid to the brake.

With these and other objects which will be set forth hereinafter my invention resides in the combinations and arrangements described and set forth in the appended claims.

In the accompanying drawing wherein two forms of my invention are shown:

Fig. 1 shows diagrammatically the preferred form of circulating system for a hoist fluid-friction-brake.

Fig. 2 is a view similar to Fig. 1, showing a modified form of the invention;

Fig. 3 is a detail vertical section on line III—III of Fig. 2;

Fig. 4 is a vertical section through a control valve shown in Fig. 1;

Fig. 5 is a detail top plan view of the pump and drive of the modified form, looking in the direction of arrow 5, Fig. 2; and Fig. 6 is a vertical section taken on line VI—VI of Fig. 5.

The invention set forth herein is intended for use with a fluid friction brake the particular form of which is immaterial in the present instance. For purposes of illustration I show one type of brake to which I am not necessarily limited, and it is to be understood that this type may be used with either form of invention described, although it is shown in connection with the modified form in Fig. 2.

The brake comprises an outer stationary part or stator 50 fastened if desired to the floor of the derrick not shown. A shaft 51 passes through the stator and has secured thereto a rotor 52 which rotates in the stator and any fluid therein. A reel 53 is provided for the cable not shown connected to the load of the hoist, and the reel rotates in one direction when the load is descending and in the opposite direction when the load is being raised. Pockets 54 and 55 in the stator and rotor, respectively, coact to effect a churning of the fluid in the brake when the load is being lowered. A pulley 56 secured to shaft 51 may be provided to drive a pump as set forth hereinafter.

Referring to Fig. 1, where the preferred form of the invention is shown, a supply tank 83 is mounted in the derrick not shown to obtain a head for the hydraulic brake 85. A coiled supply pipe 84 leads from the tank to the brake, while a discharge tank 86 is fed by a pipe 87 which extends from the brake. A pump 88 is driven by a belt 89 and sucks the fluid from the tank 86 via pipe 90 and passes it through return pipe 91 having cooling coils 92 and then back to the tank 83.

A control valve 105 is located between the coiled part of pipe 84 and the brake and is operated by an arm 110 connected to a link 111 manipulated by means not shown herein but set forth in the aforesaid divisional application. As shown in Fig. 4, the valve has a rotatable part 112 with a port 113 which can be aligned with passages 114 and 115 in the valve 105. An extension of pipe 84 affords communication between the passage 115 and the brake. When the arm 110 is in the position shown in Fig. 4, the supply tank is disconnected from the brake, so that the fluid in the brake can flow through valve 106 and pipe 87 to deplete the resisting medium in the brake. When the valve 105 is opened by the operator by moving the arm to the position shown in Fig. 1, fluid will start to flow into the brake and resistance will develop.

Fig. 2 shows the modified system wherein the supply tank 93 is mounted below the brake 94. A supply pipe 95 leads from the tank 93, and a return pipe 96 drains the fluid from the brake and delivers it to the tank. Cooling coils 97 are located in pipe 95 and other cooling coils are in pipe 96.

A pump 99 is mounted preferably in fixed relation to the brake 94 and is driven from the pulley 56 by a belt or the like 100. A clutch C for the pump has a rim 120 turned to receive the belt and is the means by which power is transmitted from the brake to the pump. A feed pipe 101 connects the brake and pump and with the parts already described forms a circulating system for fluid through the brake. A valve 117 in pipe 96 determines the rate of flow of fluid out of the brake, while another valve 118 and pipe 95 regulates the amount of fluid which can enter the pump 99.

In either form of the invention I may employ a pump drive designed to render the pump operative when the brake is turning in one direction only. As shown in Figs. 5 and 6, the rim 120 rotates about shaft 121 of pump 99, and has interiorly thereof wedge shaped pockets 123 containing driving rolls 124 which can be forced against sleeve 125 fast on the pump shaft. When the pump driving rim is turned in the direction of arrow K, Fig. 6, the rolls will cause the brake to drive the pump as the load is lowered, but when the load is raised, the brake rotates the rim in the opposite direction and the rolls release, leaving the pump idle. Under this condition, no fluid will be fed into the brake, and that which is in the brake at the time of reversal can drain out to lessen the checking action of the brake.

In the modified form of the invention, increased speed of the brake will increase the head or volume of fluid delivered to the brake and will thus magnify the braking effort at a rate commensurate with the accumulating load, thereby attaining a substantially automatic control.

From the foregoing, it will be seen that I have provided a fluid system for hydraulic brakes wherein the fluid is cooled and circulated through the brake. It will also be seen that the pump is effective to vary the head of fluid in the brake and thereby control the braking action. Furthermore, valves are provided to control the passage of fluid to and from the brake, thereby affording another means for varying the braking effort. The pumping action may also be controlled so as to feed the brake only when the latter is connected to a descending load. The valves 106, 117 and 118 may, if desired, be constructed and controlled as is valve 105, and the single direction drive for the pump may be used with either form of the invention.

Having thus described my invention and the advantages thereof, I do not wish to be limited to the details herein disclosed. What I claim as new and desire to secure by Letters Patent is:

1. In a well drilling rig brake system having a moving part the motion of which is to be checked, a dynamic fluid friction brake to check motion of the part, a discharge tank for receiving fluid heated in the brake, a cooling system, a pump driven by said moving part to move fluid from the discharge tank through the system, a supply tank to be fed with cooled fluid by the system and from which fluid flows to the brake by gravity, and connections between the supply tank and brake to feed the latter with cooled fluid.

2. In a well drilling rig brake system having a moving part the motion of which is to be checked, a dynamic fluid friction brake to check motion of the part, a discharge tank for receiving fluid heated in the brake, a cooling system, a pump driven by and in accordance with the speed of said moving part to move fluid from the tank through the system, a supply tank for receiving cooled fluid from the system, connections between the supply tank and brake to feed the latter with cooled fluid whereby fluid is fed from the supply tank to the brake by gravity, and a second cooling system in said connections.

3. In a well drilling rig brake system having a moving part the motion of which is to be checked, a dynamic fluid friction brake to check motion of the part, an elevated supply of fluid exterior to the brake, and a pump driven by said moving part for returning fluid discharging from the brake to the elevated supply.

4. In a well drilling rig brake system having a part which is driven by an increasing load the speed of which is to be controlled, a dynamic fluid friction brake to check the speed of the load, a supply of fluid exterior to the brake, means for delivering fluid from the supply to the brake by and in accordance with the speed of said moving part, means for returning fluid from the brake to the supply, and means for adjusting the relative rates at which fluid is delivered to and returned from the brake, thereby to control the active quantity of fluid in the brake and the rate of circulation therethrough.

5. In a dynamic fluid friction brake system for hoists, a fluid friction brake, a reel connected thereto for rotation in opposite directions, a supply of fluid, a pump for delivering fluid to the brake, driving connections between the pump and brake, and means to render the pump effective to pump fluid to the brake only when the latter is rotating in a given direction.

6. In a dynamic fluid friction brake system for hoists, a fluid friction brake, a fluid supply system, a pump, means connecting the brake and pump in said fluid supply system, and means effective to drive the pump by and in accordance with the speed of the brake to circulate fluid in the system that varies in accordance with the speed of the brake only when the brake is rotating in a given direction.

7. In a dynamic fluid friction brake system for hoists, a fluid friction brake, a supply tank supported at an elevation higher than the brake, to feed fluid to the brake by gravity, a pump, driving connections between the brake and pump for driving the pump by and in accordance with the speed of the brake, and a feed pipe extending from the pump to the tank through which fluid is delivered by the pump from the brake to the tank.

8. In a dynamic fluid friction brake system for hoists, a fluid friction brake, a supply tank below the brake, to receive fluid from the brake, a pump driven by the brake for returning fluid from the tank to the brake at a rate that varies by and in accordance with the speed of the brake, and means for rendering the pump effective to return fluid to the brake only when the hoist is lowering a load.

9. In a dynamic fluid friction brake system for hoists, a fluid friction brake, a reel connected thereto for rotation in opposite directions, a supply of fluid, a pump driven in accordance with the speed of the brake for automatically varying the head of fluid acting on the inlet to the brake thereby automatically varying the braking resistance of the brake at a rate differing from that at which the speed of the brake varies, and means for rendering the pump effective to pump fluid only when the brake is rotating in one direction.

10. In a dynamic fluid friction brake system for hoists, a fluid friction brake, a reel connected thereto for rotation in opposite directions, a supply of fluid, a pump driven in accordance with the speed of the brake for automatically varying the head of fluid acting on the inlet to the brake thereby automatically varying the braking resistance of the brake at a rate differing from that at which the speed of the brake varies, means for rendering the pump effective to pump fluid only when the brake is rotating in one direction, and a normally open valve in the outlet of the brake through which fluid is drained when the pump is rendered ineffective for decreasing the resistance offered by the brake when the brake is rotating in the other direction.

11. In a dynamic fluid friction brake system for hoists, a fluid friction brake, a fluid supply system, a pump, means connecting the brake and pump in said fluid supply system, means for driving the pump in accordance with the speed of operation of the brake when rotating in one direction to cause the head of fluid acting on the inlet to said brake to vary with the speed of the brake, and means for rendering the pump ineffective when the brake is rotating in the opposite direction.

12. In a dynamic fluid friction brake system for hoists, a fluid friction brake having an inlet and outlet, a circulating system for braking fluid, a pump driven in accordance with the speed of operation of the brake, means connecting the pump and system in series with the inlet and outlet of said brake, and means in the system adjacent the inlet and outlet of said brake for varying the relative rates at which fluid enters and discharges from the brake for regulating the active quantity of fluid in the brake and the rate of circulation therethrough.

13. In a dynamic fluid friction brake system for hoists, a fluid friction brake having an inlet and outlet, a circulating system for braking fluid, a pump driven in accordance with the speed of operation of the brake, means connecting the pump and system in series with the inlet and outlet of said brake, and means in the system for varying the relative rate of flow of fluid into and out of the brake thereby varying the braking effort developed by the brake independently of the speed of operation of the brake.

14. In a dynamic fluid friction brake system for hoists, a fluid friction brake, a pump driven in accordance with the speed of the brake only when the hoist is operating to lower a load, a tank, means for connecting the brake, pump and tank to form a fluid circulating system, and independently adjustable valves in said system at the inlet and outlet of said brake for adjusting the relative rates of flow of fluid into and out of the brake to thereby adjust the active quantity of fluid in the brake and its braking action and the rate of circulation of fluid through the brake.

15. In a dynamic fluid friction brake system for hoists, a fluid friction brake, a fluid supply system, a pump, means connecting the brake and pump in said fluid supply system, and means effective to drive the pump in accordance with the speed of the brake to circulate fluid in the system only when the brake is rotating in a given direction.

R. GRIFFIN DE LA MATER.